(12) United States Patent
Johnson et al.

(10) Patent No.: US 11,945,736 B2
(45) Date of Patent: Apr. 2, 2024

(54) ALGAE CULTIVATION SYSTEMS AND METHODS RELATED THERETO

(71) Applicant: ExxonMobil Technology and Engineering Company, Annandale, NJ (US)

(72) Inventors: Gregory R. Johnson, Annandale, NJ (US); Everett J. O'Neal, Asbury, NJ (US); Sarah E. Feicht, Raritan, NJ (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 343 days.

(21) Appl. No.: 17/168,112

(22) Filed: Feb. 4, 2021

(65) Prior Publication Data

US 2021/0340033 A1 Nov. 4, 2021

Related U.S. Application Data

(60) Provisional application No. 63/018,854, filed on May 1, 2020.

(51) Int. Cl.
*C02F 1/00* (2023.01)
*B01D 53/32* (2006.01)
*B01D 61/42* (2006.01)
*B01D 61/46* (2006.01)
*C02F 1/461* (2023.01)

(52) U.S. Cl.
CPC ........ *C02F 1/46109* (2013.01); *B01D 53/326* (2013.01); *B01D 61/423* (2022.08); *B01D 61/461* (2022.08); *B01D 2257/504* (2013.01); *B01D 2313/08* (2013.01); *B01D 2313/26* (2013.01); *C02F 2001/46166* (2013.01); *C02F 2201/46135* (2013.01); *C02F 2209/06* (2013.01)

(58) Field of Classification Search
CPC ........ C02F 1/46109; C02F 2001/46166; C02F 2201/46135; C02F 2209/06; B01D 53/326; B01D 61/422; B01D 61/46; B01D 2257/504; B01D 2313/08; B01D 2313/26
See application file for complete search history.

(56) References Cited

U.S. PATENT DOCUMENTS

| 2008/0087165 A1* | 4/2008 | Wright ................ B01D 53/62 96/111 |
| 2019/0160395 A1* | 5/2019 | Saini ................ B01D 1/18 |

* cited by examiner

*Primary Examiner* — Zulmariam Mendez
(74) *Attorney, Agent, or Firm* — Shook, Hardy & Bacon L.L.P.

(57) ABSTRACT

The present disclosure relates to methods and systems for algae cultivation including the integration of electrochemical carbonate production for enhancing algae growth. More particularly, the present disclosure relates to methods and systems for producing a sodium hydroxide from brine using an electrochemical cell, contacting the sodium hydroxide stream with a $CO_2$ gas sweep and producing a carbonate stream, and cultivating an algae slurry in a cultivation vessel comprising at least a portion of the carbonate stream.

19 Claims, 2 Drawing Sheets

ALGAE CULTIVATION SYSTEMS AND METHODS RELATED THERETO

CROSS-REFERENCE TO RELATED APPLICATIONS

This application is related to and claims the benefit of priority from U.S. Provisional Application No. 63/018,854 filed May 1, 2020, which is hereby incorporated by reference in its entirety.

FIELD OF THE INVENTION

The present disclosure relates to algae cultivation systems and methods and, more particularly, to electrochemical carbonate production for enhancing algae growth.

BACKGROUND OF THE INVENTION

Concerns about climate change, carbon dioxide ($CO_2$) emissions, and depleting mineral oil and gas resources have led to widespread interest in the production of biofuels from algae, including microalgae. As compared to other plant-based feedstocks, algae have higher $CO_2$ fixation efficiencies and growth rates, and growing algae can efficiently utilize wastewater, biomass residue, and industrial gases as nutrient sources.

Algae are photoautotrophic organisms that can survive, grow, and reproduce with energy derived from the sun through the process of photosynthesis. Photosynthesis is a carbon recycling process through which inorganic $CO_2$ combines with solar energy, other nutrients, and cellular biochemical processes to output gaseous oxygen and to synthesize carbohydrates and other compounds critical to the life of the algae.

To produce algal biomass, algae cells are generally grown in a water slurry comprising water and nutrients. The algae may be cultivated in indoor or outdoor environments, and in closed or open cultivation systems. Closed cultivation systems include photobioreactors, which utilize natural or artificial light to grow algae in an environment that is generally isolated from the external atmosphere. Such photobioreactors may be in a variety of shaped configurations, but are typically tubular or flat paneled. Open cultivation systems include natural and artificial ponds that utilize sunlight to facilitate photosynthesis. Artificial ponds are generally more preferred for industrial, scaled-up cultivation and are often shaped in circular (oval) or raceway-shaped configurations.

During cultivation, such as at peak algae growth rate, the rate of $CO_2$ consumption by algae cells may become high enough to deplete all or at least a substantial portion of dissolved $CO_2$ within an algae water slurry. Without the availability of $CO_2$ in adequate quantity, growth and robustness of the algae cells is hindered, limited by the mass transport rate of $CO_2$ from air into the algae water slurry. Fluctuations or lack of $CO_2$ in an algae water slurry may accordingly hinder and/or be lethal to algae growth and, therefore, delay or otherwise impede algal biomass product production.

Because the processing of algal biomass produces valuable commodities, including sustainable biofuels, as well as non-oil based products (e.g., nutraceuticals, pharmaceuticals, cosmetics, chemicals (e.g., paints, dyes, and colorants), fertilizer and animal feed, and the like), cultivation of water slurries capable of sustaining positive algae growth rates is desirable.

SUMMARY OF THE INVENTION

The present disclosure relates to algae cultivation systems and methods and, more particularly, to electrochemical carbonate production for enhancing algae growth.

In one or more aspects of the disclosure, a system is disclosed that includes an electrochemical cell to produce a sodium hydroxide stream from a brine stream and a first conduit to convey at least a portion of the sodium hydroxide stream from the electrochemical cell. A $CO_2$ gas sweep is in fluid communication with the first conduit to receive the sodium hydroxide stream and contact the sodium hydroxide stream with $CO_2$ gas to produce a carbonate stream, a second conduit to convey at least a portion of the carbonate stream from the $CO_2$ gas sweep. A cultivation vessel is in fluid communication with the second conduit to receive the carbonate stream and to contain an algae slurry for cultivation.

In one or more aspects of the disclosure, a system is disclosed that includes an electrochemical cell to produce a sodium hydroxide stream from a brine stream and a conduit to convey at least a portion of the sodium hydroxide stream from the electrochemical cell. A cultivation vessel is in fluid communication with the conduit to receive the sodium hydroxide stream and to contain an algae slurry for cultivation. A $CO_2$ gas sweep contacts the sodium hydroxide stream received by the cultivation vessel to produce a carbonate stream.

In one or more aspects of the disclosure, a method is disclosed that includes producing a sodium hydroxide from brine using an electrochemical cell, contacting the sodium hydroxide stream with a $CO_2$ gas sweep and producing a carbonate stream, and cultivating an algae slurry in a cultivation vessel comprising at least a portion of the carbonate stream.

BRIEF DESCRIPTION OF THE DRAWINGS

The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION

Figure 1:
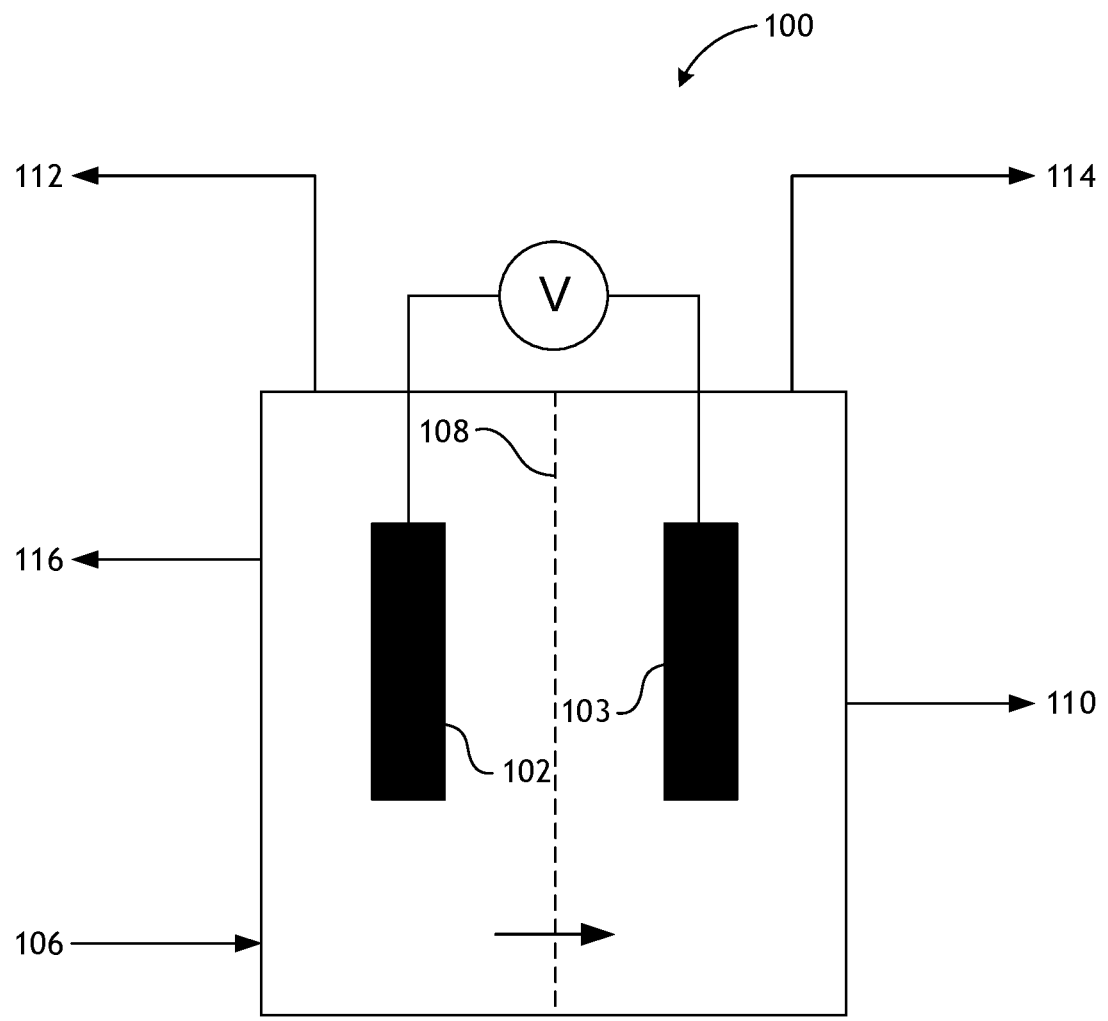
FIG. 1 illustrates an electrochemical cell for use in accordance with one or more aspects of the present disclosure.

The present disclosure relates to algae cultivation systems and methods and, more particularly, to electrochemical carbonate production for enhancing algae growth.

Biofuel production from cultivated algae slurries offers sustainable energy solutions to reduce reliance on fossil fuels and reduce greenhouse gas emissions. Other non-oil-based products can additionally be derived from algal biomass. To accomplish substantial economic, environmental, and societal impact, algae must be cultivated in large-scale systems. Such large-scale cultivation systems allow algae-derived fuels and other non-oil-based products to become more cost-effective and more widely available to the public. However, nutrients within a cultivating algae water slurry may be reduced or otherwise consumed by cultivating algae, thereby limiting or hindering algae growth and resulting in a significant bottleneck to large-scale, industrial sized processing. Traditional solutions include the use of cultivation vessels having high surface area to volume ratios, which can be costly as a substantial footprint in terms of space is necessary (e.g., larger land area for ponds or wider photobioreactors), or intense sparging or agitation of an algae water slurry to increase the gas-liquid interfacial area, which can be costly in terms of sparging equipment, energy consumption, and larger cultivation footprint (e.g., increased volume due to gas hold-up).

Unlike traditional methods, various aspects of the present disclosure describe systems and methods to reduce costs and energy consumption related to cultivating algal biomass, which replenish $CO_2$ concentration within an algae water slurry using an electrochemical cell, a $CO_2$ gas sweep, and recycled brine from water slurries used for cultivation and harvesting of algal biomass within an algae growth facility. More particularly, various aspects of the present disclosure describe systems and methods of feeding a liquid stream comprising enriched bicarbonates or carbonates to an algae water slurry as a supplemental carbon source. As such, the present disclosure describes systems and methods that promote continuous positive algae growth rates, leading to robust lipid-rich algal biomass.

As used herein, the term "algae slurry" or "algae water slurry," and grammatical variants thereof, refers to a flowable liquid comprising at least water, algae cells, and algae nutrient media (e.g., phosphorous, nitrogen, and optionally additional elemental nutrients).

Algal sources for preparing the algae slurry include, but are not limited to, unicellular and multicellular algae. Examples of such algae can include, but are not limited to, a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In some examples, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis* carterae, *Prymnesium parvum, Tetraselmis chui*, and *Chlamydomonas reinhardtii*. Additional or alternate algal sources can include one or more microalgae of the *Achnanthes, Amphiprora, Amphora, Ankistrodesmus, Asteromonas, Boekelovia, Borodinella, Botryococcus, Bracteococcus, Chaetoceros, Carteria, Chlamydomonas, Chlorococcum, Chlorogonium, Chlorella, Chroomonas, Chrysosphaera, Cricosphaera, Crypthecodinium, Cryptomonas, Cyclotella, Dunaliella, Ellipsoidon, Emiliania, Eremosphaera, Ernodesmius, Euglena, Franceia, Fragilaria, Gloeothamnion, Haematococcus, Halocafeteria, Hymenomonas, Isochrysis, Lepocinclis, Micractinium, Monoraphidium, Nannochloris, Nannochloropsis, Navicula, Neochloris, Nephrochloris, Nephroselmis, Nitzschia, Ochromonas, Oedogonium, Oocystis, Ostreococcus, Pavlova, Parachlorella, Pascheria, Phaeodactylum, Phagus, Pichochlorum, Pseudoneochloris, Pseudostaurastrum, Platymonas, Pleurochrysis, Pleurococcus, Prototheca, Pseudochlorella, Pyramimonas, Pyrobotrys, Scenedesmus, Schizochlamydella, Skeletonema, Spyrogyra, Stichococcus, Tetrachlorella, Tetraselmis, Thalassiosira, Tribonema, Vaucheria, Viridiella*, and *Volvox* species, and/or one or more cyanobacteria of the *Agmenellum, Anabaena, Anabaenopsis, Anacystis, Aphanizomenon, Arthrospira, Asterocapsa, Borzia, Calothrix, Chamaesiphon, Chlorogloeopsis, Chroococcidiopsis, Chroococcus, Crinalium, Cyanobacterium, Cyanobium, Cyanocystis, Cyanospira, Cyanothece, Cylindrospermopsis, Cylindrospermum, Dactylococcopsis, Dermocarpella, Fischerella, Fremyella, Geitleria, Geitlerinema, Gloeobacter, Gloeocapsa, Gloeothece, Halospirulina, Iyengariella, Leptolyngbya, Limnothrix, Lyngbya, Microcoleus, Microcystis, Myxosarcina, Nodularia, Nostoc, Nostochopsis, Oscillatoria, Phormidium, Planktothrix, Pleurocapsa, Prochlorococcus, Prochloron, Prochlorothrix, Pseudanabaena, Rivularia, Schizothrix, Scytonema, Spirulina, Stanieria, Starria, Stigonema, Symploca, Synechococcus, Synechocystis, Tolypothrix, Trichodesmium, Tychonema*, and *Xenococcus* species. Any combination of the aforementioned algae sources may additionally be used to prepare an algae slurry.

The water for use in preparing the algae slurry may be from any water source including, but not limited to, brackish water, seawater, brine wastewater (treated or untreated), synthetic seawater (e.g., water with added salts), and any combination thereof. That is, the water in an algae slurry contains one or more dissolved or undissolved electrolytes (e.g., salts) therein and are collectively referred to herein as "brine." As used herein, the term "brine," and grammatical variants thereof, with reference to a stream fed into the electrochemical cells of the present disclosure comprise at least 3% by weight of dissolved sodium and chlorine therein, such as in the range of about 3% to about 10% by weight of dissolved sodium and chlorine therein, encompassing any value and subset therebetween.

The algae nutrient media for use in forming an algae slurry may comprise at least nitrogen (e.g., in the form of ammonium nitrate or ammonium urea) and phosphorous. Other elemental micronutrients may also be included, such as potassium, iron, manganese, copper, zinc, molybdenum, vanadium, boron, chloride, cobalt, silicon, and the like, and any combination thereof.

As used herein, the term "cultivation vessel," "vessel," and grammatical variants thereof, refers to any of an open or closed algae cultivation system used for the growth of algal biomass, including bioreactors, photobioreactors, natural ponds, artificial ponds (e.g., raceway ponds), and the like, including combinations thereof.

As used herein, the term "electrochemical cell," and grammatical variants thereof, refers to a device capable of using electrical energy to cause a chemical reaction. More specifically, the electrochemical cell(s) described herein uses electrical energy and brine wastewater from an algae facility to produce sodium hydroxide (NaOH), which is thereafter contacted with a downstream $CO_2$ gas stream to produce sodium bicarbonate ($NaHCO_3$) for use as a $CO_2$ replenishment source for cultivating algae cells. It is to be noted that while the present disclosure is described with reference to the production of $NaHCO_3$, carbonate ions ($CO_3^{2-}$), bicarbonate ions ($HCO_3$), and other carbonate salts (e.g., calcium carbonate) or bicarbonate salts (e.g., calcium bicarbonate) may also be formed using the systems and methods described herein for use as a supplemental algae carbon source, without departing from the scope of the present disclosure. For example, depending on the catholyte pH of the electrochemical cell, either carbonate or bicarbonate will be favored. Accordingly, reference to "$NaHCO_3$" or "sodium bicarbonate" for use in the descriptions herein encompasses both carbonate and bicarbonate ions and salts.

As used herein, the term "$CO_2$ gas sweep," and grammatical variants thereof, refers to a gas comprising all or a portion of $CO_2$ therein that is contactable with another chemical or component. Examples of such gases may include, but are not limited to, pure $CO_2$, air, flue gas, and any combination thereof.

As used herein, the term "integrated," and grammatical variants thereof, with reference to at least a cultivation vessel, electrochemical cell, and $CO_2$ gas sweep, means that each are co-located and operate or function as a single assembly. For example, at least one output and/or input of the electrochemical cell and/or $CO_2$ gas sweep may be in fluid communication with the cultivation vessel. In various aspects, each of the cultivation vessel, electrochemical cell, and $CO_2$ gas sweep may be un-integrated, such that each process is separated by a time gap, for example when the output of one or more of the cultivation vessel and/or electrochemical cell is stored for a period of time (e.g., to buffer inventory).

As described hereinabove, a bottleneck to cultivating algal biomass may include complete or substantial depletion of $CO_2$ within an algae slurry, thereby hindering or preventing photosynthesis and, thus, algae growth rate. Indeed, as the algae growth increases (i.e., reaching a certain confluency), the consumption rate of $CO_2$ also increases and once the $CO_2$ is depleted from an algae water slurry, the algae growth rate is limited by the rate of $CO_2$ transport from the gas phase (e.g., air) in contact with the growth media, which can be substantially limiting, particularly when closed cultivation systems are used.

Alternative to traditional solutions, the present disclosure provides systems and methods to combat the aforementioned bottleneck by producing and adding $NaHCO_3$ to an algae water slurry during peak growth or when $CO_2$ levels are otherwise low or depleted as a supplemental source of carbon for algae metabolism to enhance algae growth rate. The systems and methods described herein may utilize otherwise wasted water from an algae facility (e.g., from cultivation and harvesting of algae), thereby reducing costs and energy associated with water treatment. For example, the various aspects described herein may permit use of reduced sized or more compact cultivation vessels (closed and/or open). Moreover, as described hereinbelow, the systems and methods of the present disclosure may permit direct coupling with $CO_2$ capturing processes and renewable electricity sources.

The $NaHCO_3$ liquid stream described herein as a supplemental carbon source for enhancing algae growth rate is produced using an electrochemical cell in combination with a $CO_2$ gas sweep, which one or both may be integrated with a cultivation vessel (see FIG. 2), including one or more of an open and/or closed cultivation vessel, or separate from a cultivation vessel, without departing from the scope of the present disclosure. The electrochemical cell may be powered by any suitable means, including for example, using direct current or by photovoltaic means (i.e., use of solar energy during peak daytime hours).

Production of the $NaHCO_3$ comprises a two-step process. First, a sodium hydroxide (NaOH) stream is produced using an electrochemical cell and a brine, which may advantageously be brine wastewater obtained from one or both of algae cultivation and harvesting processes. Second, the NaOH stream is contacted with a $CO_2$ gas sweep, which reacts to form dissolved $NaHCO_3$ within the stream (the "carbonate stream"). As used herein, the term "carbonate stream" comprises carbonate and/or bicarbonate ions or salts in an amount of greater than about 1% by weight of the carbonate stream, such as in the range of about 1% to about 30%, encompassing any value and subset therebetween, such as about 5% to about 20%, or about 5% to about 10% by weight of the carbonate stream.

Referring to FIG. 1, illustrated is an electrochemical cell for use in accordance with one or more aspects of the present disclosure. As shown, the electrochemical cell 100 comprises an anode 102 and a cathode 103 driven by an external voltage (labeled "V"). In one or all aspects, the anode 102 may be composed of platinum-clad titanium and the cathode 103 may be composed of titanium. In various aspects, the electrochemical cell 100 may comprise a membrane 108 which permits diffusion of one or more elements or compounds between the anode 102 and cathode 103.

Brine 106, such as brine wastewater from one or more processes within an algae production facility (e.g., from cultivation or harvesting), is introduced into the electrochemical cell. The brine 106 comprises one or more electrolytes or dissolved ions that drive an electrolytic reaction in the presence of the external voltage. The brine 106 collected from algae wastewater comprises at least, for example, sodium chloride (NaCl) in relatively high enough concentrations for use in the electrochemical cell 100, according to the present disclosure. In some instances, the brine 106 algae wastewater may comprise about 7% salinity depending on the particular salinity requirement of the algae species. The brine 106 contacts the anode 102, where chlorine anions are oxidized into chlorine gas ($Cl_2$), sodium (Na) diffuses through the membrane 108 (arrow shown) to contact the cathode 103, where water is reduced to form hydroxide ions and molecular hydrogen, resulting in the production of NaOH. The membrane 108 may be composed of any material that is accordingly capable of separating the anode 102 and cathode 103 and preventing (or reducing) diffusion of chlorine anions while permitting diffusion of sodium cations (Nat), thereby maintaining the charge balance between the anode 102 and cathode 103 of the electrochemical cell 100. In one or all aspects, for example, the membrane 108 may be composed of a sulfonated tetrafluoroethylene based fluoropolymer-copolymer, such as NAFION™ available from The Chemours Company located in Wilmington, Delaware.

NaOH may also be present in the brine 106. For example, a feedback loop in which $NaHCO_3$ is used as a supplemental algae carbon source will retain reformed NaOH for use as all or a portion of the brine 106. Thus, the NaOH from the brine 106 may be used to reduce the amount of NaOH that must be produced using the electrochemical cell 100. All or at least a portion of the NaOH stream 110 exits or is otherwise removed from the electrochemical cell 100 for further processing to produce water soluble $NaHCO_3$, as described hereinbelow.

The chemical reaction at the anode 102 is represented by Equation 1 and the chemical reaction at the cathode is represented by Equation 2.

$$2Cl^- \rightarrow Cl_2 + 2e^- \qquad \text{Equation 1}$$

$$2e^- + 2H_2O \rightarrow H_2 + 2OH^- \qquad \text{Equation 2}$$

Byproduct streams of chlorine ($Cl_2$) 112 and molecular hydrogen ($H_2$) 114 are therefore produced and may be removed from the electrochemical cell 100. The chlorine byproduct 112 may be used to produce various chemicals, such as hydrochloric acid, chloride salts, refrigerants, bleach, plastics (e.g., polyvinyl chloride), and the like, and any combination thereof. Moreover, the chlorine byproduct 112 may be used to disinfect various inlets and outlets of the electrochemical cell 100 (e.g., the inlet for receiving the brine wastewater 106) and other elements of an algae cultivation and harvesting process throughout an algae facility. The molecular hydrogen byproduct 114 may be used as a fuel or a reactant in various chemical processes, such as hydrogenation of unsaturated lipids produced from cultivated and harvested algae. A further byproduct steam of water 116 comprising depleted ions or salts (e.g., a NaCl "lean" stream compared to the initial brine 106) may be recycled or otherwise treated for use in various processes within an algae facility (e.g., for use in formulating an algae water slurry). In other instances, the water byproduct stream 116 may be treated and sent offsite for use in other industrial processes. That is, the byproduct streams 112, 114, 116 may each be recycled and reused to minimize costs and avoid waste.

Figure 2:
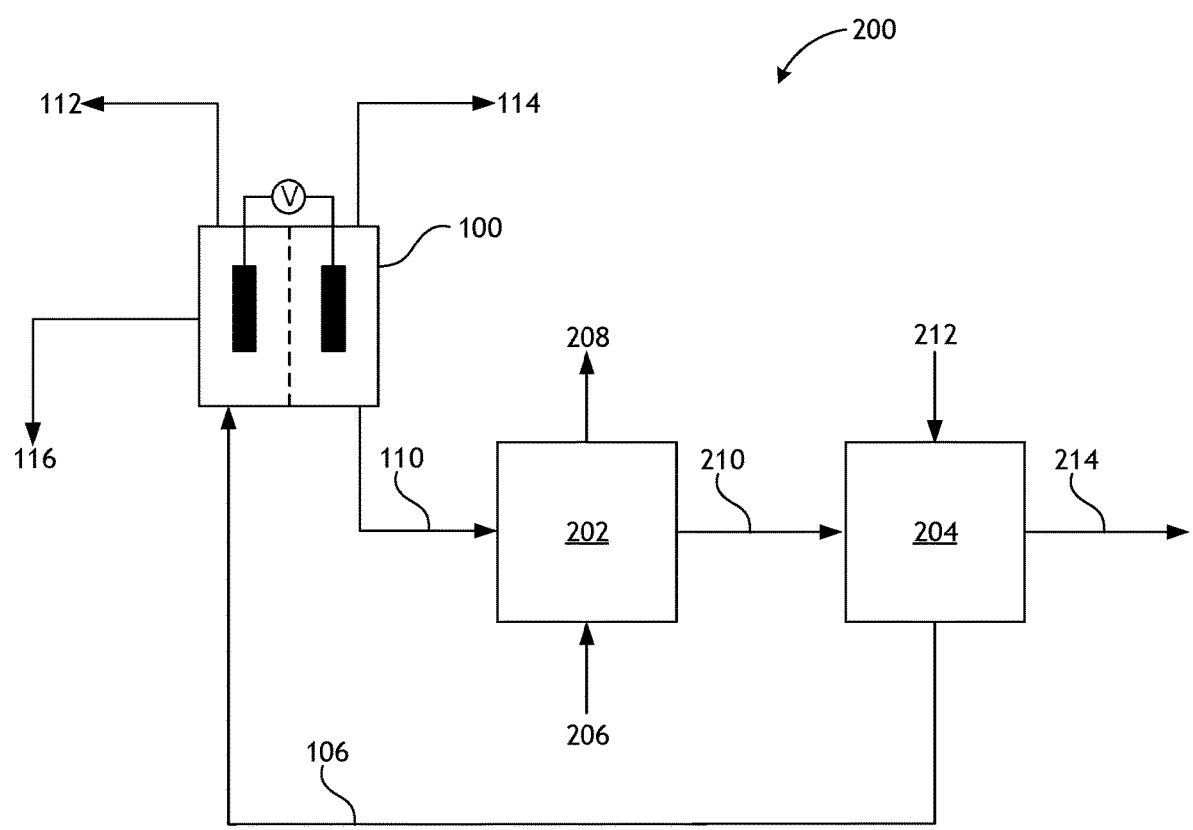
FIG. 2 illustrates an integrated system comprising an electrical cell, a $CO_2$ gas sweep, and algae cultivation vessel for supplementing carbon during algae cultivation.

Referring now to FIG. 2, illustrated is an integrated system 200 comprising an electrical cell, such as that described with reference to FIG. 1, a $CO_2$ gas sweep, and algae cultivation vessel for supplementing carbon during algae cultivation. Where like elements are included in both FIG. 1 and FIG. 2, like labels will be used. As shown, electrochemical cell 100 is integrated with a $CO_2$ gas sweep 202 and a cultivation vessel 204. The electrochemical cell 100 receives brine wastewater 106 from cultivation vessel 204 (e.g., all or a portion of waste algae water slurry). The brine wastewater 106 undergoes a chemical reaction in electrochemical cell 100, such as that described hereinabove, to produce a NaOH stream 110. Chlorine byproduct stream 112, molecular hydrogen byproduct stream 114, and water byproduct stream 116 (e.g., an NaCl lean stream) may be purged or otherwise removed from the electrochemical cell 100 and reused or recycled as described hereinabove, for example.

With continued reference to FIG. 2, the NaOH stream 110 is fed to a $CO_2$ gas sweep 202 where $CO_2$-containing gas 206 is contacted with the NaOH stream 110 in either an open or closed vessel, provided that the $CO_2$-containing gas 206 contacts the sodium hydroxide stream 110. The $CO_2$-containing gas 206 may be pure $CO_2$ or may alternatively be an intermixture of gases containing at least $CO_2$ (e.g., air, combustion gases, and the like). As used herein, the term "$CO_2$-containing gas," and grammatical variants thereof, is a gaseous phase substance comprising least about 0.04% of $CO_2$ (e.g., air), including up to 100% $CO_2$ (pure). Generally, the greater the percentage of $CO_2$ in the $CO_2$-containing gas, the greater the efficiency of the $CO_2$ gas sweep.

The configuration of the $CO_2$ gas sweep is not considered to be particularly limiting, provided that there is sufficient interfacial area between the NaOH stream 110 and the $CO_2$-containing gas 206 to facilitate high rates of $CO_2$ mass transport to the NaOH stream 110. It will be appreciated, however, that smaller interfacial areas between the NaOH stream 110 and the $CO_2$-containing gas 206 can be compensated for by increasing the duration of contact between the NaOH stream 110 and the $CO_2$-containing gas 206. The $CO_2$ gas sweep 202 of FIG. 2 is shown as a separate but integrated component of the system 200, which may be optimized to enhance gas-liquid diffusion. Alternatively, it is to be appreciated that the NaOH stream 110 may be fed directly to the cultivation vessel 204 and the $CO_2$-containing gas 206 flowed directly over or into the cultivation vessel 204 (depending on whether it is an open or closed vessel), without departing from the scope of the present disclosure. For example, when the cultivation vessel 204 selected is a closed cultivation vessel, evaporative losses may be avoided, allowing for the reuse of NaOH and avoidance of accumulated salts. Accordingly, significant reduction in energy requirements may be realized because the algae are able to fully regenerate NaOH and production of the NaOH stream 110 using the electrochemical cell 100 is only needed to balance any purged NaOH from the cultivation vessel 204. As such, energy requirements may be reduced, for example, to less than about 100 megawatts (MW) for 10,000 barrels of algae biofuel per day system, provided that the selected algae can withstand relatively high pH levels (e.g., about 9.5-10).

Moreover, the $CO_2$-containing gas 206 may be obtained from output processes throughout an algae production facility (e.g., flue gas), thus essentially forming a $CO_2$ capture system for use in the various aspects of the integrated system and process described herein. Typical $CO_2$ capture systems require rather large facility footprints to service peak summer demands, even though such large footprints are not required during cooler or nighttime conditions when power output is generally lower. The various aspects of the present disclosure enable capture and use of such gases with a relatively undersized footprint that can be seamlessly integrated with the electrochemical cell 100, and such electrochemical cells 100 may be ramped up and down more quickly than traditional $CO_2$ capture systems (e.g., by switching on and off electricity). For example, NaOH produced from electrochemical cells 100 can advantageously be stored to compensate for seasonal or daily fluctuations of $CO_2$ output from an algae production facility, facilitating faster ramp up and ramp down compared to traditional $CO_2$ capture systems.

With continued reference to FIG. 2, the reaction between the NaOH stream 110 and the $CO_2$-containing gas 206 produces a carbonate (e.g., comprising water soluble $NaHCO_3$) stream 210 and $CO_2$-lean gas 208 (i.e., having less $CO_2$ compared to the $CO_2$-containing gas 206) that may be purged from the $CO_2$ gas sweep 202 and recycled or reused. The carbonate stream 210 is introduced into one or more cultivation vessels 204 (one shown) as a source of supplemental carbon to facilitate algae cultivation. The cultivation vessel 204 may be either an open cultivation vessel or a closed cultivation vessel, without departing from the scope of the present disclosure. The process of producing and supplementing the cultivation vessel 204 may be repeated on a continuous basis, as-needed or following a specific recurring schedule, or may be ceased, without departing from the scope of the present disclosure.

The algae consumes the carbon within the carbonate stream 210 and NaOH is regenerated within the algae slurry within the cultivation vessel 204. NaOH may cause the pH of the algae slurry to increase (e.g., a typical pH target, depending on the type of algae species, for example, may be less than about 10.5). To combat the pH rise, and otherwise ensure that proper growth media requirements, volume requirements, and the like are met due to the removal of the brine wastewater 106 for use in the electrochemical cell 100, diluted brine water 212 may be used to supplement the algae slurry within the cultivation vessel 204. A sufficiently high ratio of brine water 212 to carbonate stream 210 may be fed to the cultivation vessel 204 to maintain desired pH levels. Alternatively, rather than introduce brine water 212, the algae slurry within the cultivation vessel 204 may be supplemented with an acid to maintain desired pH levels. In one or more aspects of the present disclosure, for example, the $Cl_2$ 112 byproduct stream and the $H_2$ 114 byproduct stream may be used to produce hydrochloric acid (HCl) for use as the acid. An acid-base neutralization reaction within the algae slurry in cultivation vessel 204 will consume excess NaOH due to algae consumption of carbonate (e.g., comprising water soluble $NaHCO_3$) from the carbonate stream 210 and regenerate NaCl. It is to be appreciated that the algae slurry may experience high pH levels in localized areas within the cultivation vessel 204, and either brine water 212 or an acid (e.g., HCl formed from the byproduct streams) may be introduced at or near those localized areas.

Upon reaching the desired algae confluency (i.e., desired growth concentration), biomass 214 may be harvested from the cultivation vessel 204 and further processed to produce fuel and other oil or non-oil based products. For example, one traditional processing method comprises processing an algal biomass into a paste, which may comprise between about 15-20% by weight (wt %) of algae. Thereafter, the paste is dried to a moisture level of about 10% or less, and the dried material is further processed in an extruder or other mechanical shearing device to lyse the algae cells. Various chemicals (e.g., hexane) are used to extract the lipids from the lysed algae cells for use in producing fuel or other products.

It is to be understood that various conduits may be employed to transfer the brine wastewater, the NaOH stream, and the carbonate stream between one or more of an electrochemical cell, $CO_2$ gas sweep, and cultivation vessel, including piping (flexible or nonflexible), hoses, open troughs, and the like. Similar conduits may also be used to transfer the various additional liquid and gaseous streams described hereinabove to one or more locations throughout an algae facility or for storage and recycling.

Without being bound by theory, it is believed that typical energy requirements for operating an electrochemical cell according to the present disclosure for production of a NaOH stream may be about 3 megawatt hours (MWh) per tonne of NaOH product. Assuming that the NaOH stream is used to form the carbonate stream at 100% yield, the various energy requirements may be as provided in Table 1, depending on the amount of carbonate stream used to supplement an algae slurry. For example, it is likely that an algae slurry would only require supplementation with the carbonate stream during peak growth rate, thus only a fraction of an algae facility's $CO_2$ consumption would be used in producing the carbonate stream. Further, as described hereinabove, NaOH may be recycled from the brine stream, thereby reducing the amount of NaOH that must be produced by an electrochemical cell.

Table 1 provides approximate energy requirements using the systems and methods of the present disclosure to produce a carbonate stream to supply the equivalent of 100 million metric standard cubic meters per day of $CO_2$ to a 10,000 barrels per day biofuel plant under various assumptions for the percent of carbon consumed by the algae coming from produced $NaHCO_3$. Reduced $NaHCO_3$ consumption may be achieved, for example, by only using $NaHCO_3$ to feed cultivating algae during peak growth hours (e.g., during daylight hours) where the mass transfer of $CO_2$ is most vital for the algae's growth. Table 1 provides energy requirements for algae carbon consumption ("Algae C") in tonnes per day; the energy requirements for NaOH production ("NaOH") in tonnes per day; the energy requirements for electrochemical cell operation ("ECU") in electrochemical units per day; the energy requirements for daily operation in megawatt hours per day; and the energy requirements for average power in megawatts (accounting for fluctuations based on algae growth rate and day/night cycles).

TABLE 1

| | % Carbon from $NaHCO_3$ | | | |
|---|---|---|---|---|
| | 25% | 50% | 75% | 100% |
| Algae C | 359.7 tonne/d | 719.4 tonne/d | 1079.1 tonne/d | 1438.8 tonne/d |
| NaOH | 1199.3 tonne/d | 2398.6 tonne/d | 3597.8 tonne/d | 4797.1 tonne/d |
| ECU | 1061.1 ECU/d | 2122.3 ECU/d | 3183.4 ECU/d | 4244.6 ECU/d |
| Daily Energy | 3183.4 MWh/d | 6366.9 MWh/d | 9550.3 MWh/d | 12733.8 MWh/d |
| Average Power | 132.6 MW | 265.3 MW | 397.9 MW | 530.6 MW |

Accordingly, relatively minor energy requirements may be placed on an algae production facility when employing the methods and systems of the present disclosure.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present disclosure. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more elements are presented herein. Not all features of a physical implementation are described or shown in this application for the sake of clarity. It is understood that in the development of a physical embodiment incorporating one or more elements of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Clause 1: An integrated system comprising: an electrochemical cell to produce a sodium hydroxide stream from a brine stream; a first conduit to convey at least a portion of the sodium hydroxide stream from the electrochemical cell; a $CO_2$ gas sweep in fluid communication with the first conduit to receive the sodium hydroxide stream and contact the sodium hydroxide stream with $CO_2$ gas to produce a carbonate stream; a second conduit to convey at least a portion of the carbonate stream from the $CO_2$ gas sweep; and a cultivation vessel in fluid communication with the second conduit to receive the carbonate stream and to contain an algae slurry for cultivation.

Clause 2: The system of Clause 1, wherein the brine stream is brine wastewater from the cultivation vessel.

Clause 3: The system of Clause 2, further comprising a brine conduit in fluid communication with the cultivation vessel and the electrochemical cell to convey the brine wastewater from the cultivation vessel to the electrochemical cell.

Clause 4: The system of any of the preceding Clauses, wherein the carbonate stream comprises one or more of a carbonate ion, a carbonate salt, a bicarbonate ion, and a bicarbonate salt.

Clause 5: The system of any of the preceding Clauses, wherein the carbonate stream comprises sodium bicarbonate.

Clause 6: The system of any of the preceding Clauses, wherein the cultivation vessel is a closed cultivation vessel or an open cultivation vessel.

Clause 7: An integrated system comprising: an electrochemical cell to produce a sodium hydroxide stream from a brine stream; a conduit to convey at least a portion of the sodium hydroxide stream from the electrochemical cell; a cultivation vessel in fluid communication with the conduit to receive the sodium hydroxide stream and to contain an algae slurry for cultivation; and a $CO_2$ gas sweep to contact the sodium hydroxide stream received by the cultivation vessel to produce a carbonate stream.

Clause 8: The system of Clause 7, wherein the brine stream is brine wastewater from the cultivation vessel.

Clause 9: The system of Clause 8, further comprising a brine conduit in fluid communication with the cultivation vessel and the electrochemical cell to convey the brine wastewater from the cultivation vessel to the electrochemical cell.

Clause 10: The system of any of Clause 7 to Clause 9, wherein the carbonate stream comprises one or more of a carbonate ion, a carbonate salt, a bicarbonate ion, and a bicarbonate salt.

Clause 11: The system of any of Clause 7 to Clause 10, wherein the carbonate stream comprises sodium bicarbonate.

Clause 12: The system of any of Clause 7 to Clause 11, wherein the cultivation vessel is a closed cultivation vessel or an open cultivation vessel.

Clause 13: A method comprising: producing a sodium hydroxide from brine using an electrochemical cell; contacting the sodium hydroxide stream with a $CO_2$ gas sweep and producing a carbonate stream; and cultivating an algae slurry in a cultivation vessel comprising at least a portion of the carbonate stream.

Clause 14: The method of Clause 13, wherein the brine stream is brine wastewater from the cultivation vessel, and further comprising conveying the brine wastewater to the electrochemical cell from the cultivation vessel.

Clause 15: The method of Clause 13 or Clause 14, wherein the carbonate stream comprises one or more of a carbonate ion, a carbonate salt, a bicarbonate ion, and a bicarbonate salt.

Clause 16: The method of any of Clause 13 to Clause 15, wherein the carbonate stream comprises sodium bicarbonate.

Clause 17: The method of any of Clause 13 to Clause 16, wherein the cultivation vessel is a closed cultivation vessel or an open cultivation vessel.

Clause 18: The method of any of Clause 13 to Clause 17, further comprising harvesting algae from the algae slurry.

Clause 19: The method of Clause 18, further comprising processing the harvested algae to produce biofuel.

Clause 20: The method of any of Clause 13 to Clause 19, wherein a chlorine byproduct stream and a molecular hydrogen byproduct stream is produced from the producing the sodium hydroxide from brine using an electrochemical cell, and further comprising producing hydrochloric acid from the chlorine byproduct stream and the molecular hydrogen byproduct stream.

Clause 21: The method of Clause 20, further comprising introducing the hydrochloric acid to the algae slurry in the cultivation vessel comprising at least a portion of the carbonate stream to control pH.

Therefore, the aspects of the methods and systems presented herein are well adapted to attain the ends and advantages mentioned as well as those that are inherent therein. The particular examples and configurations disclosed above are illustrative only, as the present disclosure may be modified and practiced in different but equivalent manners apparent to those skilled in the art to having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present disclosure. The aspects illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. An integrated system comprising:
   an electrochemical cell to produce a sodium hydroxide stream from a brine stream that is recycled brine wastewater from a cultivation vessel, wherein the recycled brine wastewater includes sodium hydroxide;
   a first conduit to convey at least a portion of the sodium hydroxide stream from the electrochemical cell;
   a $CO_2$ gas sweep in fluid communication with the first conduit to receive the sodium hydroxide stream and contact the sodium hydroxide stream with $CO_2$ gas to produce a carbonate stream;
   a second conduit to convey at least a portion of the carbonate stream from the $CO_2$ gas sweep; and
   the cultivation vessel in fluid communication with the second conduit to receive the carbonate stream and to contain an algae slurry for cultivation.

2. The system of claim 1, further comprising a brine conduit in fluid communication with the cultivation vessel and the electrochemical cell to convey the brine wastewater from the cultivation vessel to the electrochemical cell.

3. The system of claim 1, wherein the carbonate stream comprises one or more of a carbonate ion, a carbonate salt, a bicarbonate ion, and a bicarbonate salt.

4. The system of claim 1, wherein the carbonate stream comprises sodium bicarbonate.

5. The system of claim 1, wherein the cultivation vessel is a closed cultivation vessel or an open cultivation vessel.

6. An integrated system comprising:
an electrochemical cell to produce a sodium hydroxide stream from a brine stream that is recycled brine wastewater from a cultivation vessel, wherein the recycled brine wastewater includes sodium hydroxide;
a first conduit to convey at least a portion of the sodium hydroxide stream from the electrochemical cell;
a second conduit to convey at least a portion of the recycled brine wastewater to the cultivation vessel;
a closed cultivation vessel in fluid communication with the first conduit to receive the sodium hydroxide stream, the second conduit to receive the at least a portion of the recycled brine wastewater, and to contain an algae slurry for cultivation; and
a $CO_2$ gas sweep to contact the sodium hydroxide stream received by the cultivation vessel to produce a carbonate stream.

7. The system of claim 6, further comprising a brine conduit in fluid communication with the cultivation vessel and the electrochemical cell to convey the brine wastewater from the cultivation vessel to the electrochemical cell.

8. The system of claim 6, wherein the carbonate stream comprises one or more of a carbonate ion, a carbonate salt, a bicarbonate ion, and a bicarbonate salt.

9. The system of claim 6, wherein the carbonate stream comprises sodium bicarbonate.

10. The system of claim 6, wherein the cultivation vessel is a closed cultivation vessel or an open cultivation vessel.

11. A method comprising:
producing a sodium hydroxide from brine using an electrochemical cell;
contacting the sodium hydroxide stream with a $CO_2$ gas sweep and producing a carbonate stream; and
cultivating an algae slurry in a cultivation vessel comprising at least a portion of the carbonate stream.

12. The method of claim 11, wherein the brine stream is brine wastewater from the cultivation vessel, and further comprising conveying the brine wastewater to the electrochemical cell from the cultivation vessel.

13. The method of claim 11, wherein the carbonate stream comprises one or more of a carbonate ion, a carbonate salt, a bicarbonate ion, and a bicarbonate salt.

14. The method of claim 11, wherein the carbonate stream comprises sodium bicarbonate.

15. The method of claim 11, wherein the cultivation vessel is a closed cultivation vessel or an open cultivation vessel.

16. The method of claim 11, further comprising harvesting algae from the algae slurry.

17. The method of claim 16, further comprising processing the harvested algae to produce biofuel.

18. The method of claim 11, wherein a chlorine byproduct stream and a molecular hydrogen byproduct stream is produced from the producing the sodium hydroxide from brine using an electrochemical cell, and further comprising producing hydrochloric acid from the chlorine byproduct stream and the molecular hydrogen byproduct stream.

19. The method of claim 18, further comprising introducing the hydrochloric acid to the algae slurry in the cultivation vessel comprising at least a portion of the carbonate stream to control pH.

* * * * *